ns patent
Patented Dec. 8, 1970

3,546,041
METHODS OF PREPARING LAMINATES AND REINFORCED PLASTICS
Eugene A. Burns, Palos Verdes Estates, John F. Jones, Torrance, Hyman R. Lubowitz, Redondo Beach, and Joseph R. Spraul, Palos Verdes Estates, Calif., assignors to TRW Inc., Redondo Beach, Calif., a corporation of Ohio
No Drawing. Filed June 20, 1967, Ser. No. 647,308
Int. Cl. C09j 5/02
U.S. Cl. 156—308                4 Claims

ABSTRACT OF THE DISCLOSURE

This invention relates to novel laminated articles comprising a multiplicity of sheets of reinforcing materials bonded by interstitial layers of hard, stiff resinous material produced by the reaction of dihydroxy or dicarboxy substituted 1,2-polybutadiene or 3,4-polyisoprene, a polyfunctional organic chain extender, and a peroxide free radical initiator. These laminated articles are formed by sandwiching layers of reinforcing sheets and layers of an intermediate elastomeric material produced by the chain extension of the polydiene prepolymer. The layers of material are bonded together by the application of heat and moderate mechanical pressure.

---

This invention is a continuation-in-part of copending U.S. Pat. 3,431,235.

The thermosetting, cross-linked, cyclized polydiene resin used for the interstitial bonding adhesive of this invention belongs to the family of resins characterized by the cross-linked, linearly-extended chain of cyclized aliphatic groups discussed in copending applications Ser. No. 531,026, filed Mar. 2, 1966, now U.S. Pat. 3,431,235; Ser. No. 563,975, filed July 11, 1966, now abandoned; Ser. No. 565,074, filed July 14, 1966, now abandoned; and Ser. No. 570,171, filed Aug. 4, 1966. It is to be understood that the polyester copolymers, the polyether copolymers, the hydrocarbon copolymers, and the internally plasticized forms described in these co-pending applications may be employed in the practice of this invention as well as the described chain extenders and peroxide free radical initiators numerated therein.

Prior to this invention, laminated articles were made by bonding reinforcing sheets together with a liquid material which became a hard plastic upon polymerization. The disadvantages to laminated construction using this fabrication process are well known in the plastics industry. Workability of a liquid polymeric binder severely limits fabrication procedures. Application of the liquid polymer to the surfaces of the reinforcing sheets normally requires a horizontal, flat surface in order to have a uniform amount of the material between the sheets. Moreover, residence time in production must be sufficiently long to permit cure of the liquid polymers. These two disadvantages together with others such as toxicity and clean-up problems provide difficult, if not unpleasant, fabrication expedients for workers in the art.

Plastic laminated articles according to this invention overcome the prior art disadvantages by using a layer of a non-tacky elastomeric material for the interstitial bonding layer. This non-tacky elastomeric material is the product of a chain extension reaction of a polyfunctional polydiene having mainly pendant vinyl groups on alternate carbon atoms of an elongated backbone carbon chain and a polyfunctional organic chain extender. A peroxide free radical initiator is molecularly dispersed throughout the elastomer and upon the application of heat, initiates the cure of the elastomer to produce a hard, stiff resinous sheet. Laminated articles which may be formed by merely stacking layers of reinforcing material and the non-tacky elastomeric polymer, are flexible initially, but become hard and tough when heat-cured.

Polydiene prepolymers used in the polymeric mixture of this invention should have predominantly pendant vinyl groups on alternate carbon atoms of the backbone carbon chain, preferably constituting at least 80% of the olefinic unsaturation, and should preferably have a molecular weight from about 500 to about 3000. The preferred polydiene is 1,2-polybutadiene, although 3,4-polyisoprene is also suitable. Difunctional compounds characterized by terminal substitution are preferred, however, other polyfunctional prepolymers having functional groups located near the opposite ends of the molecule, but not necessarily the terminal positions, may be used. While a dihydroxy substituted prepolymer is generally preferred, mainly from the standpoint of ease of reactability, a dicarboxy substituted compound or other polydienic prepolymer having chemically functional groups preferably terminally positioned will also be satisfactory.

Selection of a suitable organic chain extender is dependent upon the functional groups on the prepolymers. Where the functional groups on the prepolymers are hydroxyl, chain extenders should be diisocyanates, diacid halides, diacids, or diesters. Where the functional groups on the prepolymers are carboxyl, the chain extenders should be diepoxides, diamines, diimines, diols, and diaziridines. The aliphatic or aromatic organic chain extenders are preferably difunctional, but may contain more than two functional groups.

Important to the curing steps of the process are the aliphatic and aromatic peroxide free radical initiators. These peroxide initiators are instrumental in the cyclization of the pendant vinyl groups of the polydiene and the cross-linking of adjacent chains. The peroxide initiator is introduced into the initial mixture along with the polydiene prepolymer and the organic chain extender whereupon it becomes molecularly dispersed throughout the ensuing elastomeric polymer. Upon the application of heat in the final step, the peroxide initiator decomposes to provide free radicals which force the pendant vinyl groups to join to form cross-linked, condensed cycloaliphatic chains.

In preparing these resins, the polyfunctional organic chain extender should be mixed in an approximately stoichiometric amount to the polydiene prepolymer. Adjustments are necessary when other ingredients such as copolymeric prepolymers or internal plasticizers are employed, but approximately stoichiometric amounts of the organic chain extender with respect to the prepolymeric ingredients are the preferred quantity. The peroxide is generally employed in an amount within the range of 0.5% to 10% by weight of the prepolymer, and preferably within the range of 2% to 6%. It will be appreciated that larger or smaller amounts of the peroxide may be employed and that the optimum amount is dependent upon, among other things, the particular peroxide initiator used, the polydiene prepolymer employed, and the chain extender selected for the reaction.

Preferably, after the ingredients have been mixed, the polymeric liquid should be degassed in vacuum to remove entrapped air and volatile impurities. A chain extending reaction proceeds at room temperature or moderately elevated temperatures to produce an elastomeric intermediate material characterized by having the peroxide free radical initiator molecularly dispersed throughout. While the polymer is in this elastomeric state it may be easily handled and fabricated.

Adjustment of process conditions may be achieved by the addition of carefully selected materials. Cure time, fluidity, workability, and product properties may be changed by the inclusion of one or more materials which act as a solvent or as a catalyst.

The chain extension reaction may be catalyzed to reduce reaction temperatures or time by catalytic agents which are well known in the art and some of which are described in copending applications. If enhancement of the thermosetting qualities of the elastomeric stage is desired, it may be effected by incorporating a cross-linking agent such as trimethylol propane into the prepolymer mixture. Trimethylol propane provides more functional hydroxyl groups for reaction.

The preparation of laminated structures is accomplished by stacking sheets of reinforcing material and sheets of films of the non-tacky elastomeric polymer, usually alternately, and bonding the assembly into a unitary structure by the application of heat and moderate mechanical pressure. The mechanical pressure ensures intimate contact between the layers of the materials during the heat-cure of the elastomer to a rigid tough thermoset resin. When the final article has been constructed, the rubbery intermediary is heated in the range of 150° to 400° F. whereupon cyclization and cross-linking takes place to produce a tough, stiff, transparent plastic.

A wide range of materials may be used as the reinforcing sheet material. Reinforcing materials which have a high water content, such as cellulose and cellulose products, lignin type products, and protein materials, are preferably dried because the water which would be given off by volatilization during the heat-cure would have an adverse effect on the final product. Most other materials, such as carbon, glass, silicates, plastics, metals, etc., individually or in combination, are suitable for the reinforcing sheets. Sheets of these materials may be in any convenient form.

Various modifications of laminated structures are possible according to this invention. Unlike many other laminated structures, resin rich surfaces are easily fabricated simply by adding several layers of the elastomer to the surface. Thus, any thickness of resin material can be built-up on the surface of the laminate. Also, where performance properties or economic considerations suggest the use of other materials, reinforcing sheets which have been preimpregnated with polyester resins may be placed between surface layers of the elastomeric material, thereby obtaining both the process advantages of a non-tacky rubber-like sheet and the advantages of a resin rich surface with enhanced properties on a core prepared with a less expensive plastic.

Laminates according to this invention may be employed for nearly all conventional laminated article applications. Certain features such as improved chemical inertness, improved thermal stability, and improved workability lend themselves to providing additional attractive properties not found in the conventional laminated articles. Additionally, decorative laminates may be formed by including pigmented films as a layer near the surface of the laminate and these are suitable as construction materials for suitcases, wall panels, furniture and the like. It will be understood that various modifications can be made to the described embodiments without departing from the scope of the invention.

We claim:
1. A method of making laminated articles comprising:

(A) arranging an elastomeric resin material and a reinforcing material in alternate layers, said reinforcing material being selected from the group consisting of cellulose, protein, carbon, glass, silicates, and metals, said elastomeric resin material having a peroxide radical initiator dispersed therethrough substantially unreacted and produced by the chain extension reaction of a polymeric mixture containing (1) a polydiene having (i) polyfunctional groups selected from the group consisting of hydroxyl and carboxyl and (ii) a predominant amount of vinyl groups on alternate carbon atoms on the polydiene backbone, (2) a polyfunctional chain extender capable of reacting with the functional groups on the polydiene, and (3) a peroxide radical initiator, (B) simultaneously applying heat and pressure to the layered material whereby the elastomeric resin material is cured to a hard thermoset resin.

2. A method according to claim 1 wherein the polydiene is selected from the group consisting of 1,2-polybutadiene and 3,4-polyisoprene.

3. A method according to claim 1 wherein the chain extender capable of reacting with the hydroxyl functional groups on the polydiene is selected from the group consisting of (a) diisocyanate substituted aliphatic compounds, (b) diisocyanate substituted aromatic compounds, (c) diacid halide substituted alpihatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

4. A method according to claim 1 wherein the chain extender capable of reacting with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

References Cited

UNITED STATES PATENTS

| | | | |
|---|---|---|---|
| 2,751,322 | 6/1956 | Bost | 156—334X |
| 2,835,642 | 5/1958 | Safford et al. | 156—334X |
| 3,035,953 | 5/1962 | Arnold | 156—334X |
| 3,062,242 | 11/1962 | Vanderbilt | 156—334X |
| 3,085,919 | 4/1963 | Clark | 156—334X |
| 3,099,293 | 7/1963 | Lakritz et al. | 156—334X |
| 3,111,451 | 11/1963 | Peters | 161—216 |
| 3,207,641 | 9/1965 | Small et al. | 156—334X |
| 3,268,386 | 8/1966 | Osborne | 156—334X |
| 3,321,351 | 5/1967 | Bäder | 156—334X |

CARL D. QUARFORTH, Primary Examiner

S. J. LECHERT, JR., Assistant Examiner

U.S. Cl. X.R.

156—309, 334; 161—203, 204, 208, 217, 218, 255